(12) United States Patent
Gauthier et al.

(10) Patent No.: US 7,166,946 B2
(45) Date of Patent: Jan. 23, 2007

(54) ELECTRICAL MACHINE, IN PARTICULAR FOR AN ELEVATOR

(75) Inventors: Pascal Gauthier, Asnieres-sur-Nouere (FR); Christophe Gilles, Fleac (FR); Pascal Beynaud, Saint-Saturnin (FR); Christian Rey, Linars (FR)

(73) Assignee: Moteurs Leroy-Somer, Angouleme (FR)

( * ) Notice: Subject to any disclaimer, the term of this patent is extended or adjusted under 35 U.S.C. 154(b) by 0 days.

(21) Appl. No.: 10/872,453

(22) Filed: Jun. 22, 2004

(65) Prior Publication Data

US 2005/0029883 A1  Feb. 10, 2005

(30) Foreign Application Priority Data

Aug. 8, 2003 (FR) .................................. 03 09784

(51) Int. Cl.
*H02K 5/00* (2006.01)

(52) U.S. Cl. ........................ 310/91; 310/67 R

(58) Field of Classification Search ............. 310/67 R, 310/68 R, 90, 91
See application file for complete search history.

(56) References Cited

U.S. PATENT DOCUMENTS

| | | | |
|---|---|---|---|
| 4,458,228 A | | 7/1984 | Baumgartner |
| 4,771,197 A | * | 9/1988 | Ivanto et al. ............. 310/67 R |
| 5,018,603 A | | 5/1991 | Ito ............................. 187/17 |
| 5,107,158 A | * | 4/1992 | Peck ........................... 310/90 |
| 5,962,948 A | * | 10/1999 | Hakala et al. ............... 310/268 |
| 6,057,616 A | * | 5/2000 | Pelstring ....................... 310/71 |
| 6,593,674 B2 | * | 7/2003 | Sanchez et al. ................ 310/89 |
| 6,661,137 B2 | * | 12/2003 | Gauthier .................. 310/75 R |
| 6,838,794 B2 | * | 1/2005 | Iwamoto et al. .............. 310/90 |

FOREIGN PATENT DOCUMENTS

| | | |
|---|---|---|
| EP | 0 220 981 | 5/1987 |
| EP | 0 834 463 A1 | 4/1998 |
| EP | 0 970 912 A2 | 1/2000 |
| EP | 1 057 777 A2 | 12/2000 |
| JP | 2001-019322 A | 1/2001 |
| JP | 2002-274770 A | 9/2002 |
| JP | 2004-035120 A | 2/2004 |
| JP | 2004-135448 A | 4/2004 |

\* cited by examiner

*Primary Examiner*—Darren Schuberg
*Assistant Examiner*—Nguyen Hanh
(74) *Attorney, Agent, or Firm*—Oliff & Berridge, PLLC

(57) ABSTRACT

The present invention relates to an electrical machine, comprising:
- a supporting structure;
- a stator cantilevered-out from the structure; and
- a rotor mounted to rotate on the structure about an axis of rotation in such a manner as to be capable of being driven by the stator,
- the supporting structure comprising a hollow central shaft substantially coaxial about the axis of rotation of the rotor, an electric cable for powering the stator traveling along the inside of the shaft, and the rotor having a drive surface for transmitting torque to at least one element that is to be driven, the drive surface being situated at least in part around the shaft.

17 Claims, 1 Drawing Sheet

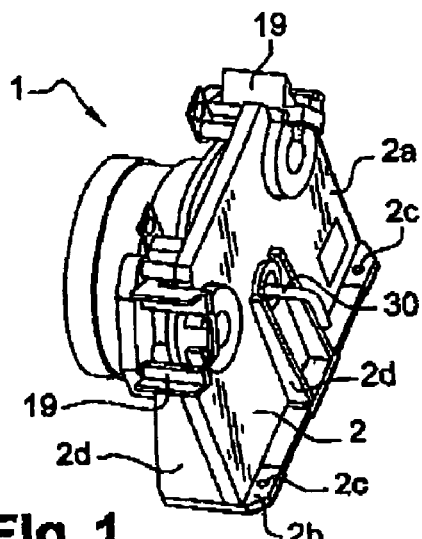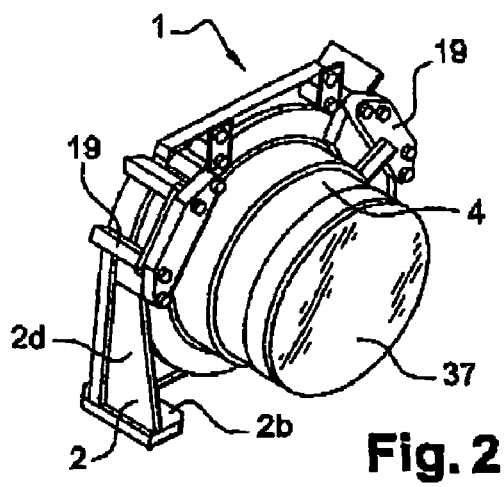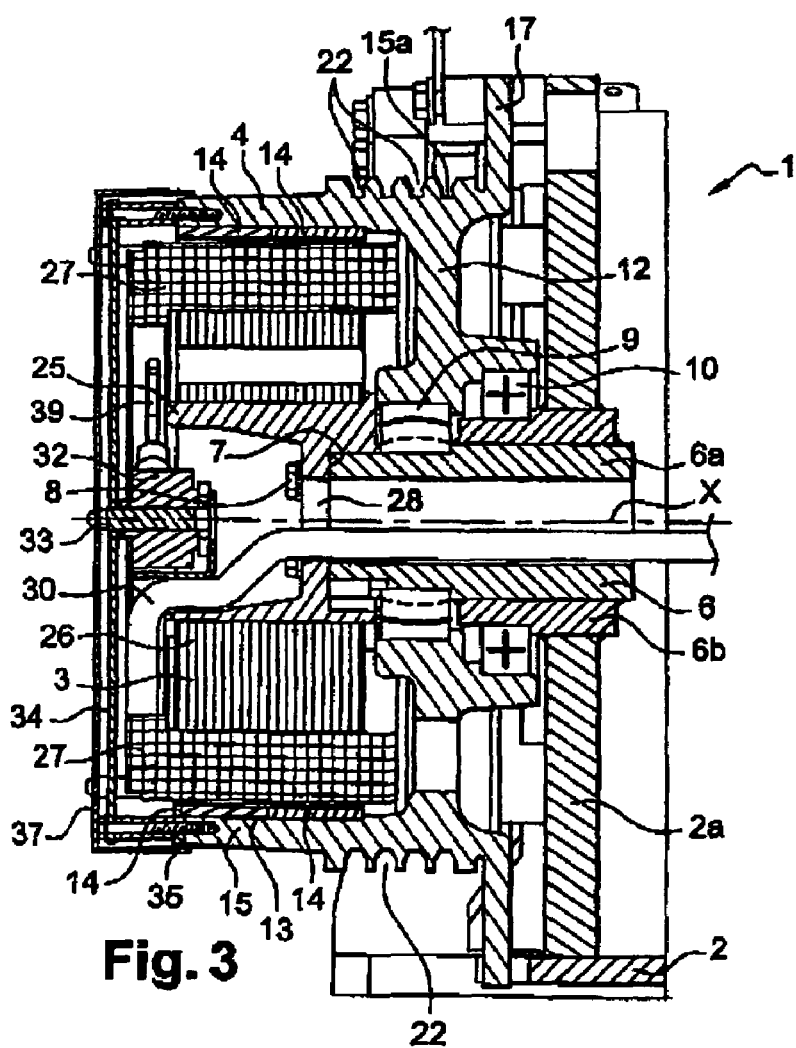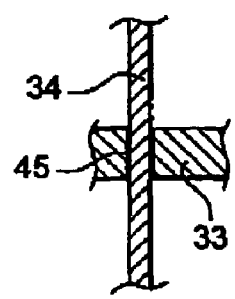

ELECTRICAL MACHINE, IN PARTICULAR FOR AN ELEVATOR

FIELD OF THE INVENTION

This non provisional application claims the benefit of French Application No. 03 09784 filed on Aug. 8, 2003.

The present invention relates to electrical machines, and more particularly but not exclusively to electrical machines for driving elevators.

There exists a need to have a machine which operates reliably and which is compact, in particular in order to make it easier to install in an elevator shaft.

There also exists a need for a machine that is relatively easy to manufacture and easy to repair, where necessary.

The invention seeks to satisfy these requirements.

BRIEF SUMMARY OF THE INVENTION

The invention provides an electrical machine comprising:
a supporting structure;
a stator cantilevered-out from the structure; and
a rotor mounted to rotate on the structure about an axis of rotation in such a manner as to be capable of being driven by the stator,
the supporting structure including a hollow central shaft substantially coaxial about the axis of rotation of the rotor, an electric cable for powering the stator running along the inside of the shaft, and the rotor presenting a drive surface for transmitting torque to at least one element that is to be driven, such as for example a cable or a belt, and situated at least in part around the shaft, in particular in the immediate vicinity of the supporting structure.

The term "is situated at least in part around the shaft" is used to mean that there exists at least one plane substantially perpendicular to the axis of rotation that intersects both the shaft and the drive surface.

The drive surface is preferably situated around the shaft, at least for the most part, and possibly substantially completely.

The position of the drive surface, close to the supporting structure, makes it possible to reduce the stresses that are associated with a cantilevered configuration, thus making it possible to reduce the strength of the supporting structure.

Passing the cable that is connected to the stator through the hollow shaft makes a more compact configuration possible.

Such a disposition also makes it easier to build the machine, in particular in terms of access to the stator.

The invention thus makes it possible to install or replace the stator more easily, either during or after manufacture, for example in order to adapt the machine to a special request by using a specific stator.

Where appropriate, the invention also makes it possible to use a motor that is longer and more powerful, while still keeping the drive surface close to the supporting structure.

The drive surface may include grooves for receiving cables or belts driven by the machine.

In an examplary implementation of the invention, the rotor includes a disk extending substantially perpendicularly to the axis of rotation of the rotor, and the supporting structure may include at least one brake having a friction member arranged to press against said disk, e.g. two brakes disposed on substantially opposite sides of the supporting structure.

The disk may be situated between the supporting structure and the drive surface.

On its side remote from the end of the shaft through which the cable connected to the stator extends, the machine may include a removable cap. The cap may cover a rod that turns with the rotor and that rotates a pin of a position sensor. Removing the cap gives easy access to the stator, to the electrical connections, and to the sensors.

The connection between the rod and the sensor pin may be rigid, or in a variant it may be flexible, or it may enable the rod to move relative to the pin, e.g. by means of an opening formed through the pin and having the rod pass therethrough.

The rotor may include a circularly cylindrical inside surface having permanent magnets fixed thereto, e.g. by adhesive.

The stator may be bolted to the shaft, thus making it easier to assemble and optionally to replace.

The rotor may comprise a one-piece body carrying the magnets and, where appropriate, having grooves machined therein for receiving cables or belts that are designed to be driven by the machine.

The shaft may be a one-piece structure or it may be built up by assembling two coaxial sleeves together.

BRIEF DESCRIPTION OF THE DRAWING

The invention can be better understood on reading the following detailed description of non-limiting embodiments thereof, and on examining the accompanying drawing, in which:

FIGS. 1 and 2 are two perspective views from different angles showing an example of a machine made in accordance with the invention;

FIG. 3 is a diagrammatic axial section of the machine of FIGS. 1 and 2; and

FIG. 4 shows an embodiment detail in a variant implementation of the invention.

MORE DETAILED DESCRIPTION

The electrical machine 1 shown in the figures is for driving the cables of an elevator (not shown), and it comprises a main structure 2 for fixing to a structural element of an elevator shaft, for example.

This structure 2 carries a stator 3 which can be seen in section in FIG. 3.

The machine 1 also comprise a rotor 4 that rotates relative to the structure 2 and to the stator 3 about an axis of rotation X.

The structure 2 comprises an end plate 2a extending perpendicularly to the axis X, and provided at its bottom end with rims 2b having orifices 2c for passing fastener elements for securing to the supporting structure.

Ribs 2d stiffen the plate 2a.

The structure 2 also comprises a hollow stationary shaft 6 made of metal which extends coaxially about the axis X, having one axial end 7 fixed by means of bolts 8 to the stator 3. The rotor 4 is mounted on bearings 9 and 10 carried by circularly cylindrical surfaces of the shaft 6.

In the example described, the shaft 6 is made by assembling together an inner sleeve 6a and an outer sleeve 6b, the two sleeves being coaxial.

The outer sleeve 6b is welded to the end plate 2a, while the inner sleeve 6a is welded to the inside of the outer sleeve 6b and projects beyond it, going away from the plate 2a so as to provide a support for the bearing 9.

Each of the sleeves 6a and 6b has a shoulder so as to enable the corresponding bearings 9 and 10 to bear axially thereagainst.

In a variant, the shaft 6 could be single piece.

In the embodiment described, the rotor 4 comprises a one-piece body 12 with a tubular skirt 15 having a portion 13 of its inside surface circularly cylindrical about the axis X.

Permanent magnets are fixed to this portion 13, e.g. by adhesive.

The body 12 also includes a disk 17 which is connected to the end of the skirt 15 that is adjacent to the structure 2 and against which conventional brake blocks 19 can be engaged in order to brake the rotor, e.g. in the absence of electricity being fed to the stator 3. The brakes 19 are electrically controlled, for example, and comprise blocks coated in friction linings that are caused to clamp against the disk 17 during braking.

Grooves 22 are made in an outer drive surface 15a of the skirt 15 close to the end thereof that is adjacent to the disk 17 in order to receive the cables or belts that are to be driven.

Given the proximity of the surface 15a to the end plate 2a, the cantilever and the resulting stresses are small.

The stator 3 comprises a central element 25 releasably secured by bolts 8 to the hollow shaft 6 and serving as a support for a stack of laminations 26 defining teeth having coils 27 engaged thereon.

The stator is wound on the teeth, with each teeth carrying a coil that is specific thereto, this type of winding also being referred to as "concentrated winding". In a variant, the stator could be wound differently.

The central element 25 has a central opening 28 enabling a cable 30 to pass through for powering the coils 27 of the stator, the cable 30 passing inside the shaft 6 and extending outside the machine so as to be connected to a speed-varying circuit, for example. The cable 30 comprises four conductors each having a section of 6 square millimeters ($mm^2$), for example.

The machine also includes a position sensor 32 shown diagrammatically in FIG. 3, comprising a rotary pin 33 that turns with the rotor, being driven by a rod 34 held by screws 35 to the end of the skirt 15 that is remote from the disk 17.

The rod 34 is covered by a protective cap 37 that turns with the rotor.

The position sensor 32 delivers information relating to the position of the rotor relative to the stator, which information is conveyed by a cable 39 (not shown in full in FIG. 3) which likewise passes through the opening 28 and runs along the inside of the shaft 6 to reach the outside of the motor beside the structure 2.

It will be understood that the invention provides easy access to the stator 30, since to gain such access it suffices to remove the protective cap 37.

Naturally, the invention is not limited to the embodiment described above.

In particular, the electrical machine may be used for driving, not an elevator, but, for example, a tire if it constitutes a drive wheel, or a winch.

The electrical motor may also be made differently, in particular concerning how the magnets are secured and the disposition of the stator coils.

In the example shown, the motor extends almost entirely inside the part having the cable or belt driving grooves formed therein, however a longer motor could be used without changing the positioning of said grooves relative to the end plate of the structure.

As shown in FIG. 4, the rod 34 can pass through an opening 45 in the pin 33 of the position sensor, being capable of moving relative to said pin 33. This can serve to reduce the mechanical stresses that are exerted on the pin 33 in the event of the rotor being off center.

Throughout the description, including in the claims, the term "comprising a" should be understood as being synonymous with "comprising at least one", unless specified to the contrary.

Although the present invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. An electrical machine capable of driving at least one of an elevator, a tire or a winch, comprising:
    a supporting structure, comprising:
        a hollow central shaft, and
        two bearings carried by the hollow central shaft;
    a stator cantilevered-out from the structure; and
    a rotor mounted to rotate on the two bearings about an axis of rotation and comprising a portion facing the stator that is cantilevered-out from the structure,
    the supporting structure comprising the hollow central shaft substantially coaxial about the axis of rotation of the rotor, an electric cable for powering the stator traveling along an inside of the shaft, and the rotor having a drive surface for transmitting torque to at least one element that is to be driven, the drive surface being situated at least in part around the shaft.

2. A machine according to claim 1, wherein the at least one element comprises a cable or a belt.

3. A machine according to claim 1, wherein the drive surface is situated in the immediate vicinity of the supporting structure.

4. A machine according to claim 1, wherein the drive surface is situated at least for the most part around the shaft.

5. A machine according to claim 1, wherein a cable connected to a position sensor travels along the inside of the shaft.

6. A machine according to claim 1, wherein the drive surface comprises grooves for receiving cables or belts driven by the machine.

7. A machine according to claim 1, comprising a removable cap on a side remote from the end of the shaft through which the electric cable traveling along the inside thereof extends.

8. A machine according to claim 7, wherein the removable cap covers a rod rotating with the rotor and driving a position sensor pin in rotation.

9. A machine according to claim 8, wherein the sensor pin comprises an opening through which the rod passes.

10. A machine according to claim 1, wherein the rotor has a circularly cylindrical surface having permanent magnets fixed thereto.

11. A machine according to claim 1, wherein the stator is bolted to the shaft.

12. A machine according to claim 1, wherein the rotor comprises a one-piece body carrying magnets, and having grooves machined therein to receive belts or cables that are to be driven by the machine.

13. A machine according to claim 1, wherein the shaft is formed by assembling together two coaxial sleeves.

14. A machine according to claim 1, wherein the stator is placed at an end of the hollow central shaft and outside of the two bearings.

15. An electrical machine capable of driving at least one of an elevator, a tire or a winch, comprising:
- a rotor;
- a supporting structure, comprising:
  - a hollow central shaft substantially coaxial about an axis of rotation of the rotor, and
  - two bearings carried by the hollow central shaft, wherein the rotor is mounted to rotate on the two bearings about the axis of rotation;
- a stator cantilevered-out from the structure; and
- an electric cable for powering the stator traveling along an inside of the shaft,
- wherein the rotor has a drive surface situated at least in part around the shaft for transmitting torque to at least one element that is to be driven, the rotor comprises a disk extending substantially perpendicularly to the axis of rotation, and the supporting structure carries at least one brake comprising a friction member arranged to bear against the disk.

16. An electrical machine capable of driving at least one of an elevator, a tire or a winch, comprising:
- a supporting structure including a hollow central shaft substantially coaxial about an axis of rotation of a rotor and two bearings carried by the hollow central shaft;
- a stator cantilevered-out from the structure in a direction substantially parallel to the axis of rotation;
- the rotor mounted to rotate on the two bearings about the axis of rotation and comprising a portion facing the stator that is cantilevered-out from the structure; and
- an electric cable for powering the stator traveling along an inside of the shaft,
- wherein the rotor has a drive surface situated at least in part around the shaft for transmitting torque to at least one element that is to be driven.

17. A machine according to claim 16, wherein the stator is placed at an end of the hollow central shaft and outside of the two bearings.

* * * * *